(12) United States Patent
Suciu et al.

(10) Patent No.: US 9,869,183 B2
(45) Date of Patent: Jan. 16, 2018

(54) THERMAL BARRIER COATING INSIDE COOLING CHANNELS

(71) Applicant: United Technologies Corporation, Hartford, CT (US)

(72) Inventors: Gabriel L. Suciu, Glastonbury, CT (US); Brian D. Merry, Andover, CT (US); James D. Hill, Tolland, CT (US); Wesley K. Lord, South Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 330 days.

(21) Appl. No.: 14/799,994

(22) Filed: Jul. 15, 2015

(65) Prior Publication Data

US 2016/0032731 A1    Feb. 4, 2016

Related U.S. Application Data

(60) Provisional application No. 62/032,039, filed on Aug. 1, 2014.

(51) Int. Cl.
*F01D 5/08*    (2006.01)
*F01D 5/28*    (2006.01)

(52) U.S. Cl.
CPC .............. *F01D 5/082* (2013.01); *F01D 5/084* (2013.01); *F01D 5/085* (2013.01); *F01D 5/288* (2013.01); *Y02T 50/672* (2013.01); *Y02T 50/676* (2013.01)

(58) Field of Classification Search
CPC ... F01D 5/022; F01D 5/06; F01D 5/08; F01D 5/081; F01D 5/082; F01D 5/084; F01D 5/085; F01D 25/12; F05D 2300/20; F05D 2300/30; F05D 2230/30; F05D 2230/90; F05D 2240/20; F05D 2240/24
See application file for complete search history.

(56) References Cited

U.S. PATENT DOCUMENTS

| | | | |
|---|---|---|---|
| 5,735,671 A * | 4/1998 | Brauer | F01D 5/081 415/177 |
| 6,408,610 B1 * | 6/2002 | Caldwell | C23C 14/046 29/889.2 |

(Continued)

FOREIGN PATENT DOCUMENTS

| | | |
|---|---|---|
| EP | 1802784 | 2/2012 |
| WO | 2014052288 | 4/2014 |

*Primary Examiner* — Nathaniel Wiehe
*Assistant Examiner* — Elton Wong
(74) *Attorney, Agent, or Firm* — Carlson, Gaskey & Olds, P.C.

(57) ABSTRACT

A rotor for a gas turbine engine according to an exemplary aspect of the present disclosure includes, among other things, a rotor disk rotatable about an axis and a gas path wall coupled to and radially outward of the rotor disk. The gas path wall bounds a radially inward portion of a gas path. A plurality of rotor spokes are radially intermediate the rotor disk and the gas path wall. The plurality of rotor spokes is circumferentially spaced to define a plurality of cooling channels intermediate the rotor disk and the gas path wall. A thermal barrier coating is disposed on a surface of at least one of the plurality of cooling channels. A method of cooling a rotor assembly is also disclosed.

20 Claims, 5 Drawing Sheets

(56) References Cited

U.S. PATENT DOCUMENTS

| | | | |
|---|---|---|---|
| 8,784,061 B2* | 7/2014 | Are | F01D 5/066 415/175 |
| 8,845,288 B2* | 9/2014 | Tholath | F01D 5/081 416/219 R |
| 2006/0078417 A1 | 4/2006 | Benton | |
| 2006/0110254 A1 | 5/2006 | Itzel et al. | |
| 2007/0116574 A1* | 5/2007 | Itzel | F01D 5/082 416/193 A |
| 2007/0248457 A1 | 10/2007 | Dodd et al. | |
| 2009/0075023 A1 | 3/2009 | Cosack et al. | |
| 2011/0280716 A1 | 11/2011 | Konitzer et al. | |
| 2013/0101436 A1* | 4/2013 | Colson | F04D 29/329 416/97 R |
| 2013/0108445 A1* | 5/2013 | Suciu | F01D 5/026 416/95 |
| 2013/0108468 A1 | 5/2013 | Suciu et al. | |
| 2015/0322795 A1* | 11/2015 | Thomas | F01D 5/188 427/8 |

\* cited by examiner

THERMAL BARRIER COATING INSIDE COOLING CHANNELS

CROSS-REFERENCE TO RELATED APPLICATION

The present disclosure claims priority to U.S. Provisional Patent Application No. 62/032,039 filed Aug. 1, 2014.

BACKGROUND

The present disclosure relates to a gas turbine engine and, more particularly, to a cooling arrangement for a rotor assembly.

Typical gas turbine engines include a fan delivering air into a bypass duct as propulsion air. The fan also delivers air into a core flow path of a core engine where it is compressed in a compressor section. Compressed air is then delivered into a combustion section where it is mixed with fuel and ignited. Products of the combustion pass downstream over turbine rotors in a turbine section, driving them to rotate. Typically, but not necessarily, some of the core flow air is used to cool components in the turbine or other sections, as is known in the art.

At least one of the compressor and turbine sections typically includes a rotor assembly. The rotor assembly can operate in an environment in which significant pressure and temperature differentials exist across various portions of the rotor assembly. Some rotor assemblies include a secondary cooling flow path to provide cooling to portions of the rotor assembly.

SUMMARY

A rotor for a gas turbine engine according to an example of the present disclosure includes a rotor disk rotatable about an axis. A gas path wall is coupled to and radially outward of the rotor disk. The gas path wall bounds a radially inward portion of a gas path. A plurality of rotor spokes are radially intermediate the rotor disk and the gas path wall. The plurality of rotor spokes are circumferentially spaced to define a plurality of cooling channels intermediate the rotor disk and the gas path wall. A thermal barrier coating is disposed on a surface of at least one of the plurality of cooling channels.

In a further embodiment of any of the foregoing embodiments, the thermal barrier coating is disposed on a surface of the gas path wall defining one of the plurality of cooling channels.

In a further embodiment of any of the foregoing embodiments, the thermal barrier coating is disposed on the rotor spoke.

In a further embodiment of any of the foregoing embodiments, the rotor disk and the gas path wall are attached at an interface along the rotor spoke, the thermal barrier coating extending radially outward from the interface.

In a further embodiment of any of the foregoing embodiments, the thermal barrier coating extends radially inward from the interface.

In a further embodiment of any of the foregoing embodiments, surfaces of the gas path wall bounding the gas path are free of the thermal barrier coating.

In a further embodiment of any of the foregoing embodiments, surfaces of the plurality of cooling channels facing radially outwards from the axis are free of the thermal barrier coating.

In a further embodiment of any of the foregoing embodiments, a radially innermost surface of each of the plurality of cooling channels is free of the thermal barrier coating.

A further embodiment of any of the foregoing embodiments includes a plurality of airfoils extending radially outward from the rotor disk. Each of the plurality of airfoils includes a platform forming at least a portion of the gas path wall.

A further embodiment of any of the foregoing embodiments includes a spacer extending axially from the rotor disk. The spacer includes a plurality of spacer spokes circumferentially aligned with the plurality of rotor spokes such that the plurality of cooling channels extend axially from the rotor disk.

A section for a gas turbine engine according to an example of the present disclosure includes an outer gas path wall bounding a radially outward portion of a gas path. A plurality of rotor stages each include a rotor disk rotatable about an axis, and an inner gas path wall coupled to and radially outward of the rotor disk. The inner gas path wall bounds a radially inward portion of the gas path. A plurality of airfoils extends radially outward from the rotor disk. Each of the plurality of airfoils includes a platform forming at least a portion of the inner gas path wall. A plurality of rotor spokes extends radially between the rotor disk and each platform. The plurality of rotor spokes are circumferentially spaced to define a plurality of cooling channels between the rotor disk and each platform. A thermal barrier coating is disposed on a surface of at least one of the plurality of cooling channels.

In a further embodiment of any of the foregoing embodiments, the plurality of rotor stages includes a first rotor stage and a second rotor stage. The thermal barrier coating extends axially along the plurality of cooling channels between at least the first rotor stage and the second rotor stage.

In a further embodiment of any of the foregoing embodiments, the thermal barrier coating is disposed on surfaces of the plurality of cooling channels facing radially inwards and is defined by the first rotor stage and the second rotor stage.

In a further embodiment of any of the foregoing embodiments, a thickness of the thermal barrier coating disposed on the plurality of cooling channels of the first rotor stage is different from a thickness of the thermal barrier coating disposed on the plurality of cooling channels of the second rotor stage.

In a further embodiment of any of the foregoing embodiments, surfaces of the gas path radially between the inner gas path wall and the outer gas path wall are free of the thermal barrier coating.

In a further embodiment of any of the foregoing embodiments, each of the plurality of airfoils includes a shroud extending radially outward from an airfoil section, the shroud forming at least a portion of the outer gas path wall.

A further embodiment of any of the foregoing embodiments includes a spacer extending axially from the rotor disk. The spacer includes a plurality of spacer spokes circumferentially aligned with the plurality of rotor spokes such that the plurality of cooling channels extend axially from the rotor disk.

In a further embodiment of any of the foregoing embodiments, the plurality of cooling channels is connected to receive cooling air from an upstream compressor stage.

A method of cooling a rotor assembly according to an example of the present disclosure includes the steps of providing a rotor disk rotatable about an axis, providing a gas path wall coupled to and radially outward of the rotor disk, the gas path wall bounding a gas path, providing a plurality of spokes intermediate the rotor disk and the gas path wall, the plurality of rotor spokes being circumferentially spaced such that there is a plurality of cooling channels intermediate the rotor disk and the gas path wall, and controlling thermal conductivity through the gas path wall into the plurality of cooling channels by using a thermal barrier coating disposed on at least a portion of the plurality of cooling channels.

A further embodiment of any of the foregoing embodiments includes the step of permitting thermal conductivity between the rotor disk and the plurality of cooling channels.

Although the different examples have the specific components shown in the illustrations, embodiments of this disclosure are not limited to those particular combinations. It is possible to use some of the components or features from one of the examples in combination with features or components from another one of the examples.

The various features and advantages of this disclosure will become apparent to those skilled in the art from the following detailed description. The drawings that accompany the detailed description can be briefly described as follows.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
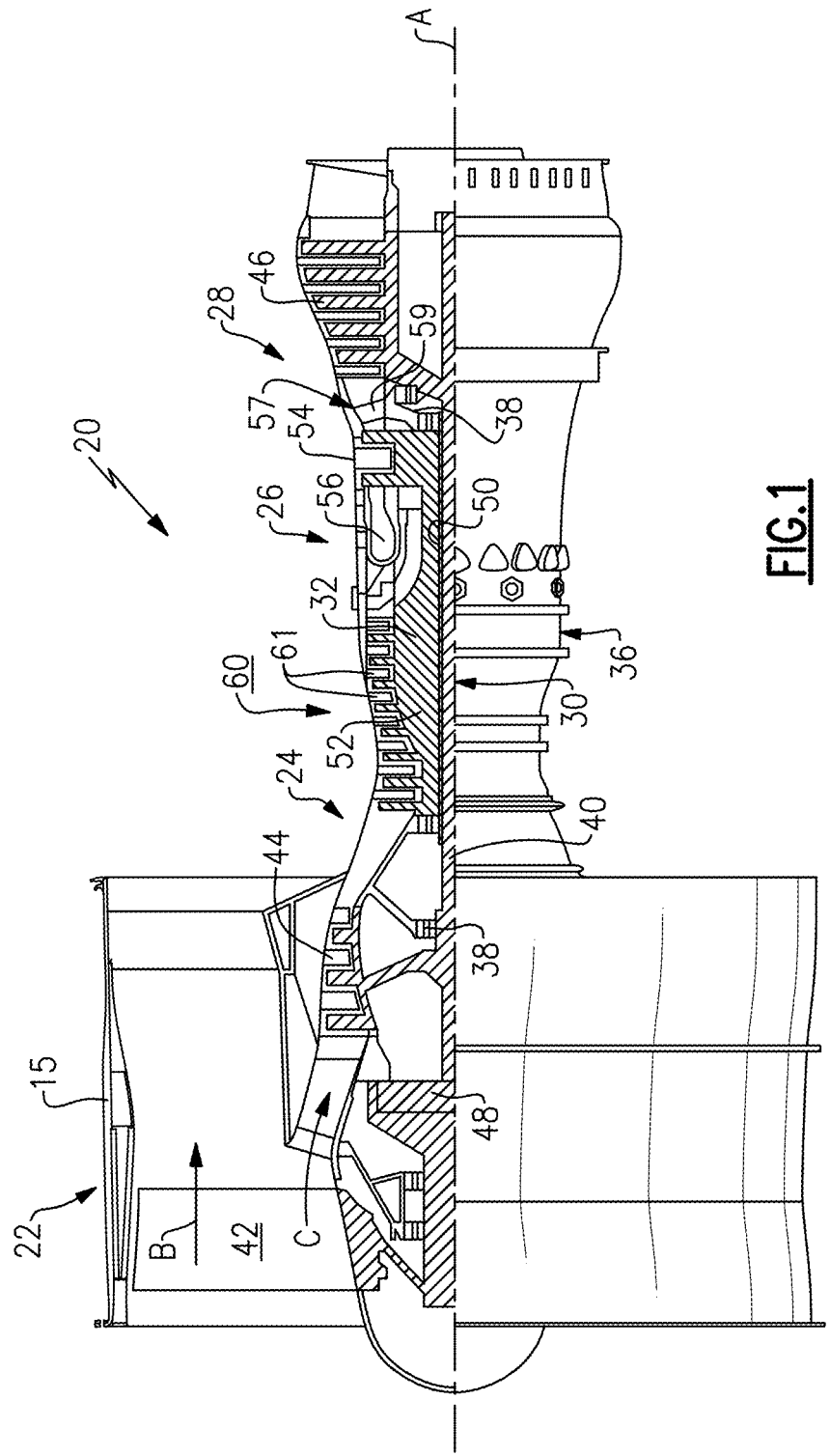
FIG. 1 is a schematic cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as may be applied to other types of turbine engines including three-spool architectures and ground-based engines that do not have a fan.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second.

Figure 2:
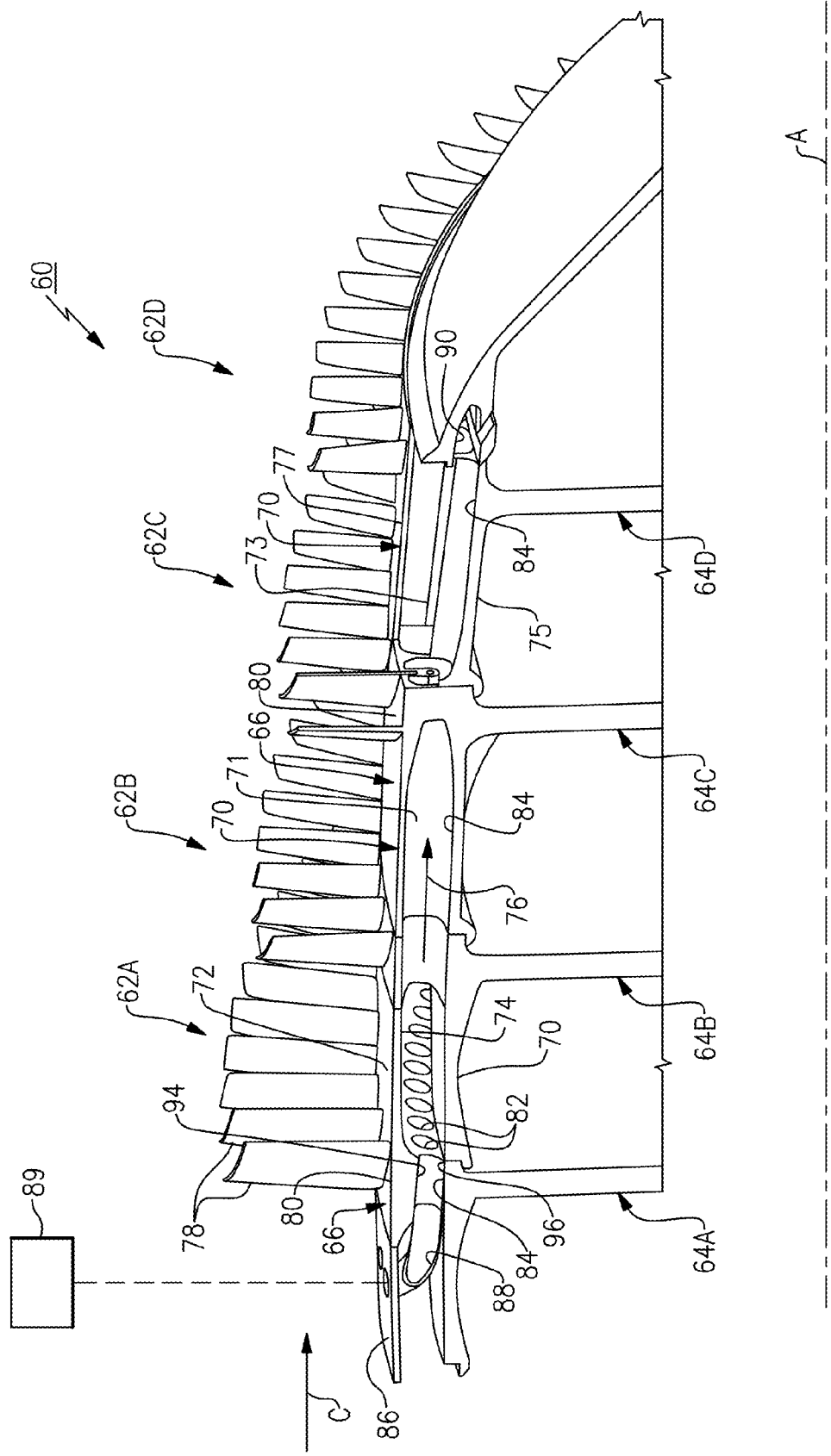
FIG. 2 is a partial perspective view of a rotor assembly.

FIG. 2 illustrates an isolated schematic perspective view of a rotor assembly 60 of the gas turbine engine 20. In this disclosure, like reference numerals designate like elements where appropriate and reference numerals with the addition of one-hundred or multiples thereof designate modified elements that are understood to incorporate the same features and benefits of the corresponding original elements. In this example, the rotor assembly 60 is located in the compressor section 24, such as the high pressure compressor 52. In other examples, the rotor assembly 60 is located in the turbine section 28. However, other parts of the gas turbine engine 20 may alternatively or additionally benefit from these examples. Other systems may also benefit from the teachings herein, including ground based power generation and marine based systems.

The rotor assembly 60 includes one or more rotor stages 62. In some examples, the rotor assembly 60 includes a first rotor stage 62A, a second rotor stage 62B, a third rotor stage 62C and a fourth rotor stage 62D. However, other quantities of rotor stages are contemplated herein. Each of the rotor stages 62 includes vanes 61 (shown in FIG. 1) within a portion of the core flow path C.

Figure 3A:
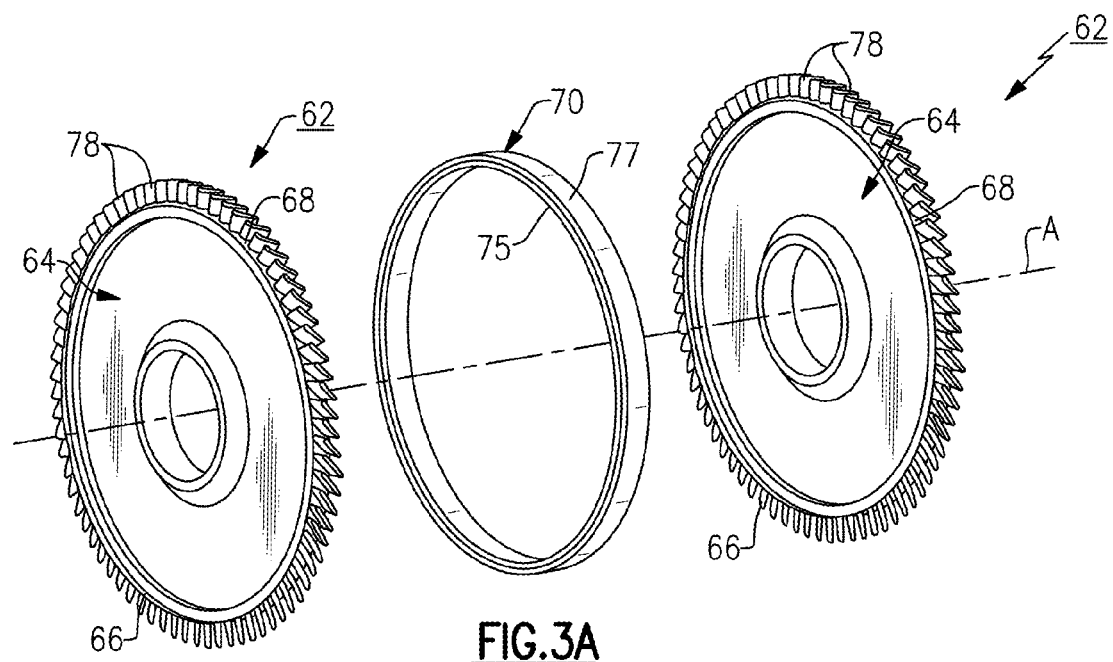
FIG. 3A is an exploded view of a portion of the rotor assembly of FIG. 2.
Figure 3B:
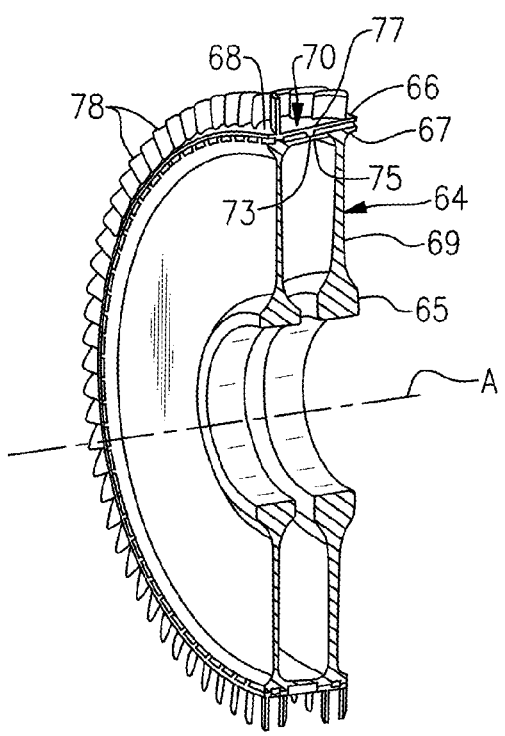
FIG. 3B is a partial perspective view of the rotor assembly of FIG. 3A.

Referring also to FIGS. 3A and 3B, each rotor stage 62 includes at least one rotor disc 64. Each rotor disc 64 includes a hub 65, arranged concentrically about the axis A, a rim 67, and a web 69 extending between the hub 65 and the rim 67. The rims 67 are configured to receive upstream and downstream rims 67 with the last rim 67 joining to the rear hub 65 or outer shaft 50, for rotation about the axis A.

Each of the rotor stages 62 also includes a core gas path wall 66 radially outward of the rotor disc 64. The core gas path wall 66 includes a radially outer surface 72 bounding a flow path, such as the core flow path C, and also an opposed radially inner surface 74 bounding a cooling flow path 76 (shown in FIG. 2). The core gas path wall 66 is configured to minimize fluid communication between the core flow path C and the cooling flow path 76.

Each rotor disc 64 includes airfoils 78 extending radially outward from each of the rotor discs 64. Each airfoil 78 includes a platform 80 forming at least a portion of the core gas path wall 66. In some examples, the airfoils 78 are rotatable blades. In another example, the airfoils 78 are static vanes.

Figure 3C:
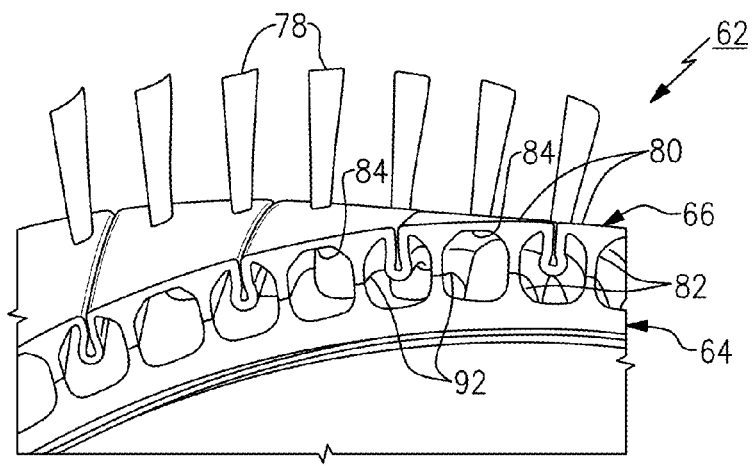
FIG. 3C is an axial view of a portion of the rotor assembly of FIG. 3A.

FIG. 3C illustrates an isolated axial view of a portion of one of the rotor stages 62. Each of the rotor stages 62 can include one or more rotor spokes 82 intermediate the rotor disc 64 and the core gas path wall 66. The rotor spokes 82 have a relatively lesser circumferentially thickness than the rotor disc 64 and the core gas path wall 66 to minimize thermal conductivity between the rotor disc 64 and the core gas path wall 66.

In some examples, the rotor stage 62 is a hybrid dual alloy integrally bladed rotor (IBR) in which the core gas path wall 66 and/or airfoils 78 are manufactured of one type of material and the rotor disk 64 is manufactured of different material. Bi-metal construction provides material capability to separately address different temperature requirements. For example, the airfoils 78 can be manufactured of a single crystal nickel alloy that are transient liquid phase bonded with the rotor disk 64 which is manufactured of a different material such as an extruded billet nickel alloy. Alternatively, or in addition to the different materials, the core gas path wall 66 and/or airfoils 78 may be subject to a first type of heat treat and the rotor disk 64 to a different heat treat. That is, the Bi-metal construction as defined herein includes different chemical compositions as well as different treatments of the same chemical compositions such as that provided by differential heat treatment. The rotor disc 64 and the core gas path wall 66 can be attached at an interface 92 along the rotor spoke 82. Of course, the rotor disc 64 and core gas path wall 66 can be formed of the same materials, and may also be mechanically attached in another conventional manner.

The rotor spokes 82 are circumferentially spaced about the axis A such that there is a plurality of cooling channels 84 radially intermediate the rotor disc 64 and a radially inner surface of core gas path wall 66. The cooling channels 84 define a portion of the cooling flow path 76 (shown in FIG. 2). The cooling channels 84 can have various geometries such as a polygon, a generally circular configuration, or a generally rectangular configuration. However, other geometries of the cooling channels 84 are contemplated and can be selected based on the cooling demands and geometries of the rotor stages 62.

Referring back to FIGS. 3A and 3B, each rotor stage 62 can include at least one spacer 70 having a generally annular geometry and extending axially from at least one rotor disc 64 to bound the core flow path C (shown in FIG. 2). However, each spacer 70 can have different geometries to bound the core flow path C. The rotor discs 64 and spacers 70 are arranged in a stacked configuration to define a portion of the rotor assembly 60. Each spacer 70 can be integrally formed with the rotor disc 64 and/or core gas path wall 66. In other examples, each spacer 70 is a separate component and can include a plurality of sections extending circumferentially around the axis A to define an array.

Each of the spacers 70 can include a plurality of spacer spokes 71 which are circumferentially aligned with the plurality of rotor spokes 82, such that the plurality of cooling channels 84 extend axially from the rotor disc 64. Each of the spacers 70 can also define a spacer interface 73 in which an inner portion 75 and an outer portion 77 are attached at the spacer interface 73 using conventional techniques such as those described above in attaching the rotor disc 64 and the core gas path wall 66.

The cooling channels 84 are connected to receive coolant provided to an inlet 86 (FIG. 2), through an inlet duct 88, by a coolant source 89. In some examples, the coolant source 89 is bleed air from an upstream compressor stage, such as a stage of the low pressure compressor 44. In other examples, the coolant source 89 is ambient air from the bypass flow path B. The coolant provided to the cooling flow path 76 receives heat rejected from select portions of the rotor assembly 60, which is then discharged via an outlet 90. The relatively warm air communicated to the outlet 90 can be provided to another portion of the engine 20, such as a downstream combustor 56 or a portion of the turbine 28, or can be discharged overboard the aircraft.

Figure 4A:
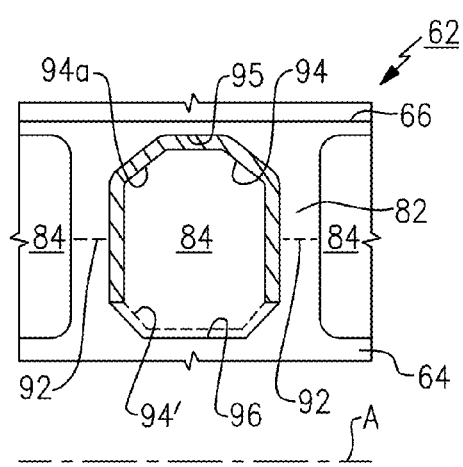
FIG. 4A is a schematic cross section view of a thermal barrier coating arrangement.

Referring to FIG. 4A, a thermal barrier coating ("TBC") 94 is disposed on a surface of the cooling flow path 76

(shown in FIG. 2) to minimize heat transfer between the core gas path wall 66 and the cooling flow path 76. The thermal barrier coating 94 can be disposed on a surface of at least one of the cooling channels 84 utilizing various techniques. For example, the thermal barrier coating 94 can be disposed on a surface of the cooling channels 84 by air plasma spraying, or chemical vapor deposition. However, other techniques for disposing the thermal barrier coating 94 are contemplated. The thermal barrier coating 99 can be made of various materials such as ceramics, alumina, or zirconia, although other materials or composites are also contemplated. The material of the thermal barrier coating 94 can be selected according to the operating conditions of the rotor assembly 60, and in some examples, to the operating conditions of each rotor stage 62. Minimizing heat transfer between the core gas path wall 66 and the cooling flow path 76 can reduce the amount of cooling requirements of the rotor assembly 60 by selectively delivering relatively cooler fluid in the cooling flow path 76 to select portions of the rotor assembly 60, including the radially inward portions of the rotor stages 62 such as each rotor disc 64.

The thermal barrier coating 94 can be disposed on various surfaces defining the cooling flow path 76 to provide the general benefits described herein. In some examples, the thermal barrier coating 94 is disposed on at least a radially outermost surface 95 of at least one of the cooling channels 84 to minimize thermal conductivity between the core gas path wall 66 and the cooling flow path 76. The further examples, the thermal barrier coating 94 extends radially outward from at least one of the interfaces 73, 92, and can also extend radially inward from at least one of the interfaces 73, 92. In yet other examples, the thermal barrier coating 94 is disposed on each surface of the cooling flow path 76 facing radially inward and being defined by one of the rotor stages 62. This arrangement advantageously provides cooling to the radially inward portions of the rotor stages 62, while minimizing thermal conductivity between the core gas path wall 66 and the cooling flow path 76. Another benefit of disposing the thermal barrier coating 94 on at least a radially outermost surface 95 is that, as the rotor disc 64 rotates about the axis A, the centrifugal loading on the thermal barrier coating 94 minimizes spallation or liberation of the thermal barrier coating 94 from the cooling channel 84. This permits the engine designer to select a thermal barrier coating having relatively good thermal characteristics without undue consideration of the tensile characteristics of the thermal barrier coating to oppose the centrifugal loading.

In some examples, the radially innermost surface 96 of each of the cooling channels 84 is free of the thermal barrier coating 94, and in further examples, surfaces of the cooling flow path 76 facing radially outwards from the axis A is also free of the thermal barrier coating 94. In yet further examples, surfaces of the cooling flow path 76 facing radially outwards from the axis A, such as the radially innermost surface 96 of each of the cooling channels 84, are free of any thermal barrier coating, including the thermal barrier coating 94 or another thermal barrier coating. In some examples, the surfaces of the cooling flow path 76 facing radially outwards from the axis A are free of any coating. This minimizes the risk of spallation or liberation of the thermal barrier coating 94, wherein the thermal barrier coating 94 chips off or otherwise disjoins from the radially outer surface 72 of the gas path wall 66 and is communicated through the core flow path C as debris. Debris can undesirably result in surface erosion or other degradation of downstream components in communication with the core flow path C and can disrupt operation of the engine 20. Disposing a thermal barrier coating on the radially outer surface 72 of the gas path wall 66 may also result in contact with adjacent components such as a stationary vane 61 disposed in the core flow path C due to a rub out condition during transient conditions of the engine 20. Of course, the thermal barrier coating 94 can be disposed on substantially each surface of the cooling channels 84 while obtaining the general benefits described herein. For example, a thermal barrier coating 94' is disposed on each surface of a cross-section of at least one of the cooling channels 84 to minimize thermal conductivity between the cooling flow path 76 and the rotor disc 64. The arrangement of thermal barrier coating 94' may be desirable to deliver coolant to an adjacent or downstream portion of one of the cooling channels 84 based upon design parameters. However, disposing the thermal barrier coating 94' on the radially innermost surface 96 of the cooling channel 84 may cause a portion of the thermal barrier coating 94' to spall due to the centrifugal load observed by rotation of the rotor disc 64 about the axis A during operation of the engine 20.

Figure 4B:
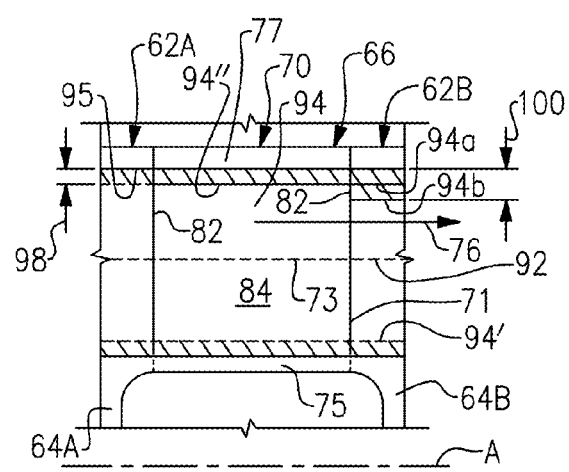
FIG. 4B is a schematic axial view of the thermal barrier coating arrangement of FIG. 4A.

Referring to FIG. 4B, which is a cross-sectional view along axis A of a portion of the rotor assembly 60, the thermal barrier coating 94 can have different axial arrangements with respect to the rotor assembly 60. The rotor assembly 60 can be configured such that the thermal barrier coating 94a extends axially along the cooling flow path 76 between at least two rotor stages 62, such as the first rotor stage 62A and the second rotor stage 62B illustrated in FIG. 4B. The thermal barrier coating 94a can extend axially along at least one of the spacers 70. The thermal barrier coating 94 can also be disposed on surfaces of the inlet duct 88 and/or the outlet 90 (shown in FIG. 2). In other examples, an upstream one of the rotor stages 62, such as rotor stage 62A, can be free of any thermal barrier coating 94", while the thermal barrier coating 94" can be disposed on a surface of one of the cooling channels 84 of a downstream one of the rotor stages 62, such as rotor stage 62B. This arrangement permits the coolant to receive some heat rejected from the core gas path wall 66 of the upstream one of the rotor stages 62 depending on design parameters.

A thickness of thermal barrier coating 94 can also vary axially along the cooling flow path 76. As illustrated by FIG. 4B, a thickness 98 of the thermal barrier coating 94 disposed on a surface of the cooling flow path 76 defined by the rotor stage 62A is different than a thickness 100 of the thermal barrier coating 94 disposed on a surface of the cooling flow path 76 defined by the second rotor stage 62B. The thickness 100 can be greater than the thickness 98 to minimize thermal conductivity between the core gas path wall 66 and the cooling flow path 76 according to the temperature characteristics and cooling requirements of each of the rotor stages 62.

The thermal barrier coating 94 can be disposed onto a surface of the cooling flow path 76 as one or more distinct layers. For example, the thermal barrier coating 94 can be formed by at least two layers 94a, 94b, although more than two layers are contemplated. The layers 94a, 94b can include different materials depending on the thermal characteristics of the respective rotor stage 62, for example. In other examples, the thermal barrier coating 94 is disposed on the cooling channel 84 as a single layer having a substantially uniform thickness. It is contemplated that the thermal barrier coating 94 can be arranged to have a different thickness and can be made of different materials in the radial, circumferential and/or axial directions.

Figure 5:
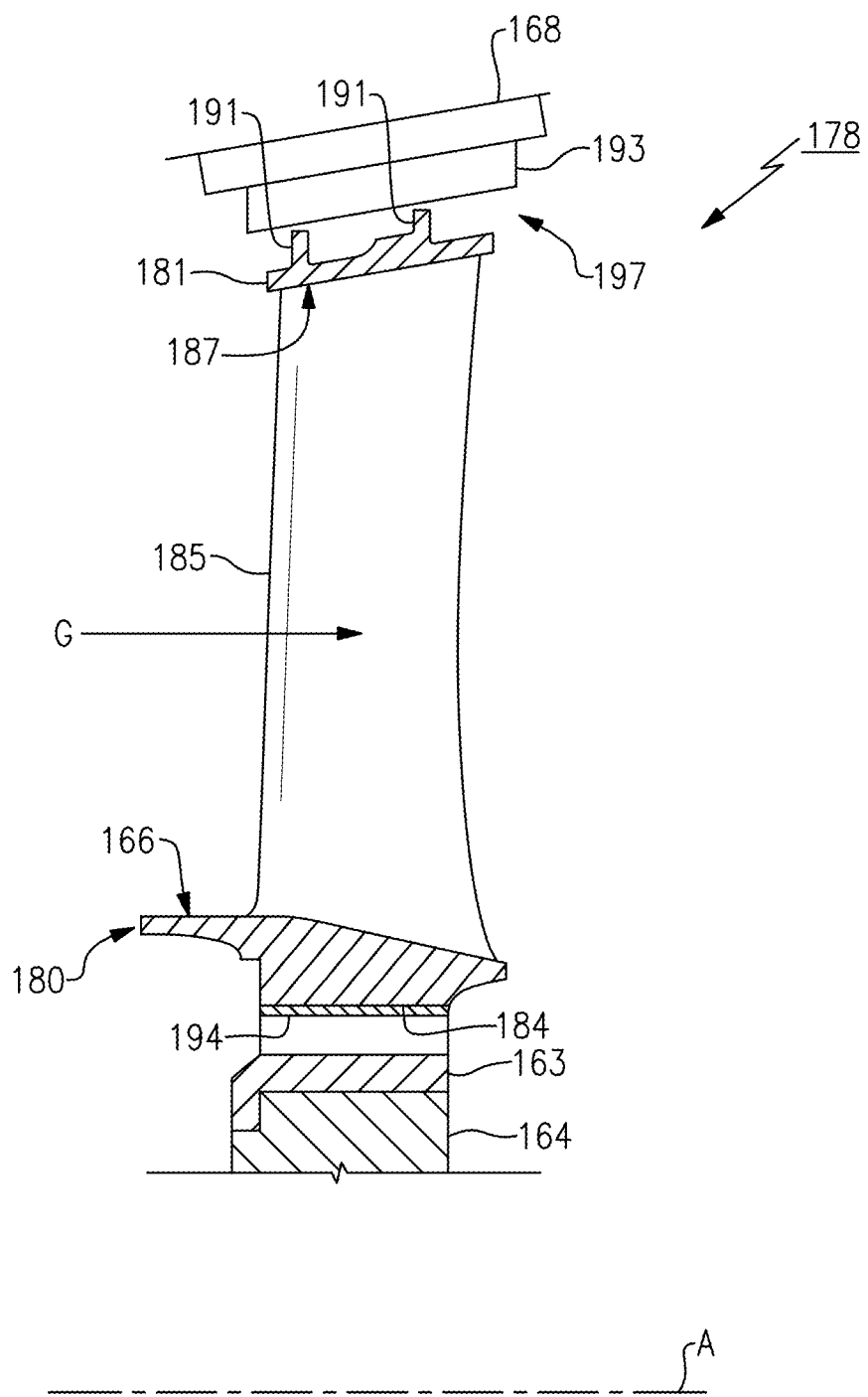
FIG. 5 is a side view of a second embodiment of an airfoil having a thermal barrier coating arrangement.

FIG. 5 illustrates a highly schematic view of a second embodiment of an airfoil 178 having a thermal barrier coating arrangement. The airfoil 178 includes an airfoil section 185 and a root section 163 attached to the rotor disc 164 utilizing various techniques known in the art. The airfoil section 185 extends radially between an inner platform 180 forming at least a portion of a core gas path wall 166 and a shroud 181. The shroud 181 forms at least a portion of an outer gas path wall 187. The airfoil 178 is configured to rotate about the engine central longitudinal axis A.

The shroud 181 can include one or more sealing elements 191, such as knife edges, configured to cooperate with a sealing feature 193. The sealing feature 193 can be an abradable honeycomb structure, for example, to define a seal 197. In other examples, the sealing elements 191 and the sealing feature 193 can be arranged to define a labyrinth seal. The sealing feature 193 can be a component attached to, or formed in, a casing 168 or another static structure. The casing 168 can be provided by the turbine section 28, for example. The seal 197 is configured to account for different relative thermal characteristics of the airfoil 178, the rotor disk 164, and the casing 168. Accordingly, the seal 197 minimizes a leakage flow of the combustion products from a gas path G and into radial space between the sealing feature 193 and the shroud 181. It should be appreciated that other seal arrangements including a shroud are contemplated.

At least one cooling channel 184 is formed in the root section 163 of the airfoil 178. A thermal barrier coating 194 is disposed on various surfaces of the cooling channel 184 utilizing any of the arrangements disclosed herein. It should also be appreciated that the airfoil 178 arrangement can be utilized in combination with any of the rotor arrangements disclosed herein, such that at least one rotor stage of the engine 20 can include the airfoil 178. Cooling of the rotor assembly 60 operates as follows. Coolant is provided to the rotor assembly 60 at the inlet 86 and through the inlet duct 88. The coolant is then communicated from the inlet duct 88 to the cooling flow path 76 defined by the plurality of cooling channels 84. The coolant accepts heat communicated from portions of the rotor disc 64. Rather, the arrangement of thermal barrier coating 94 permits thermal conductivity between the core flow path C and the core gas path wall 66. Thermal conductivity through the core gas path wall 66 into the plurality of cooling channels 84 is controlled by using the thermal barrier coating 94. Thermal conductivity is permitted between the rotor disc 64 and the cooling flow path 76, such that the coolant accepts heat rejected from at least one of the rotor disks 64 as the coolant is communicated between the inlet 86 and the outlet 90 of the rotor assembly 60. The relatively warmer coolant is communicated to the outlet 90, which can be distributed to another portion of the gas turbine engine 20, such as a downstream combustor section 56 or the turbine section 28, or can be discharged overboard.

Although particular step sequences are shown, described, and claimed, it should be understood that steps may be performed in any order, separated or combined unless otherwise indicated and will still benefit from the present disclosure.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A rotor for a gas turbine engine comprising:
a rotor disk rotatable about an axis;
a gas path wall coupled to and radially outward of the rotor disk, the gas path wall bounding a radially inward portion of a gas path;
a plurality of rotor spokes radially intermediate the rotor disk and the gas path wall, the plurality of rotor spokes being circumferentially spaced to define a plurality of cooling channels intermediate the rotor disk and the gas path wall; and
a thermal barrier coating disposed on a surface of at least one of the plurality of cooling channels, wherein surfaces of the gas path wall bounding the gas path are free of the thermal barrier coating.

2. The rotor as recited in claim 1, wherein the thermal barrier coating is disposed on a surface of the gas path wall defining one of the plurality of cooling channels.

3. The rotor as recited in claim 2, wherein the thermal barrier coating is disposed on the rotor spoke.

4. The rotor as recited in claim 1, wherein the rotor disk and the gas path wall are attached at an interface along the rotor spoke, the thermal barrier coating extending radially outward from the interface.

5. The rotor as recited in claim 4, wherein the thermal barrier coating extends radially inward from the interface.

6. The rotor as recited in claim 1, wherein surfaces of the plurality of cooling channels facing radially outwards from the axis are free of the thermal barrier coating.

7. The rotor as recited in claim 1, wherein a radially innermost surface of each of the plurality of cooling channels is free of the thermal barrier coating.

8. The rotor as recited in claim 1, further comprising a plurality of airfoils extending radially outward from the rotor disk, each of the plurality of airfoils including a platform forming at least a portion of the gas path wall.

9. The rotor as recited in claim 1, further comprising a spacer extending axially from the rotor disk, the spacer including a plurality of spacer spokes circumferentially aligned with the plurality of rotor spokes such that the plurality of cooling channels extend axially from the rotor disk.

10. The rotor as recited in claim 1, wherein the rotor disk is compressor rotor disk.

11. A section for a gas turbine engine comprising:
an outer gas path wall bounding a radially outward portion of a gas path;
a plurality of rotor stages each comprising:
a rotor disk rotatable about an axis;
an inner gas path wall coupled to and radially outward of the rotor disk, the inner gas path wall bounding a radially inward portion of the gas path;
a plurality of airfoils extending radially outward from the rotor disk, each of the plurality of airfoils including a platform forming at least a portion of the inner gas path wall;
a plurality of rotor spokes extending radially between the rotor disk and each platform, the plurality of rotor spokes being circumferentially spaced to define a plurality of cooling channels between the rotor disk and each platform;
a thermal barrier coating disposed on a surface of at least one of the plurality of cooling channels;
wherein the plurality of rotor stages includes a first rotor stage and a second rotor stage, the thermal barrier coating extending axially along the plurality of cooling channels between at least the first rotor stage and the second rotor stage; and
wherein the thermal barrier coating is disposed on surfaces of the plurality of cooling channels facing radially inwards and being defined by the first rotor stage and the second rotor stage.

12. The section as recited in claim 11, wherein a thickness of the thermal barrier coating disposed on the plurality of cooling channels of the first rotor stage is different from a thickness of the thermal barrier coating disposed on the plurality of cooling channels of the second rotor stage.

13. The section as recited in claim 11, wherein surfaces of the gas path radially between the inner gas path wall and the outer gas path wall are free of the thermal barrier coating.

14. The section as recited in claim 11, wherein each of the plurality of airfoils includes a shroud extending radially outward from an airfoil section, the shroud forming at least a portion of the outer gas path wall.

15. The section as recited in claim 11, further comprising a spacer extending axially from the rotor disk, the spacer including a plurality of spacer spokes circumferentially aligned with the plurality of rotor spokes such that the plurality of cooling channels extend axially from the rotor disk.

16. The rotor assembly as recited in claim 11, wherein the plurality of cooling channels is connected to receive cooling air from an upstream compressor stage.

17. The section as recited in claim 11, wherein the plurality of rotor stages are compressor rotor stages.

18. The section as recited in claim 11, wherein surfaces of the plurality of cooling channels facing radially outwards from the axis are free of the thermal barrier coating.

19. A method of cooling a rotor assembly comprising the steps of:
providing a rotor disk rotatable about an axis;
providing a gas path wall coupled to and radially outward of the rotor disk, the gas path wall bounding a gas path;
providing a plurality of spokes intermediate the rotor disk and the gas path wall, the plurality of rotor spokes being circumferentially spaced such that there is a plurality of cooling channels intermediate the rotor disk and the gas path wall;
controlling thermal conductivity through the gas path wall into the plurality of cooling channels by using a thermal barrier coating disposed on at least a portion of the plurality of cooling channels; and
wherein surfaces of the plurality of cooling channels facing radially outwards from the axis are free of the thermal barrier coating.

20. The method as recited in claim 19, comprising the step of permitting thermal conductivity between the rotor disk and the plurality of cooling channels.

* * * * *